United States Patent Office 3,441,522
Patented Apr. 29, 1969

3,441,522
CURABLE, TACKY POLYMERS OF WATER AND A POLYEPOXIDE AND PROCESS FOR THE PREPARATION THEREOF
Anthony C. Soldatos, Kendall Park, and Allison S. Burhans, Millington, N.J., assignors to Union Carbide Corporation, a corporation of New York
No Drawing. Filed Aug. 16, 1965, Ser. No. 480,194
Int. Cl. C08g 30/00; C09j 3/16
U.S. Cl. 260—2                                         18 Claims

ABSTRACT OF THE DISCLOSURE

This invention relates to curable, tacky polymers of water and a polyepoxide having at least two epoxy groups per molecule, formed on reacting water with the polyepoxide in the presence of a tertiary amine. The polymers of this invention can be used as binders in structural laminates and in filament wound structures.

---

This invention relates to curable, tacky polyepoxide polymers, to compositions based thereon and to a process for the preparation of these polymers by the reaction of a polyepoxide with water. More particularly, this invention relates to curable, tacky polyepoxide polymers and to cured products obtained therefrom which are characterized by excellent compressive modulus (ASTMD–695–61) generally in excess of about 1,000,000 p.s.i. and by excellent compressive yield strength (ASTMD–695–61) generally in excess of about 38,000 p.s.i.

The cured products of this invention, by reason of their excellent compressive properties, are highly attractive for use as binders in filament wound, deep sea submergence vehicles and in structural laminates which are to be subjected to high compressive forces. The cured products of this invention successfully resist undesirable deformation and undergo no undesirable loss of strength when subjected to such high compressive forces.

The curable, tacky polymers of this invention, in addition to being cured to thermoset products characterized by excellent properties, are ideally suited for impregnating glass filaments and the like which are to be used in the production of filament wound structures in general. The tacky nature of the polymers allows them to tenaciously adhere to the filaments to which they have been applied.

The curable, tacky polymers of this invention prepared by polymerizing a polyepoxide having at least two epoxy groups per molecule with water in the presence of a tertiary amine, generally have an epoxide equivalent weight of about 30 to about 550 and preferably have an epoxide equivalent weight of about 90 to about 250.

Illustrative of suitable polyepoxides, for purposes of this invention, are the polyglycidylethers of polyhydric phenols, exemplified by the polyglycidylethers of such phenols as the mono-nuclear polyhydric phenols, resorcinol and pyrogallol, the di- or polynuclear phenols, such as the bisphenols described in Bender et al., U.S. Patent 2,506,486 and polyphenylols such as the novolak condensation product of a phenol and a saturated or unsaturated aldehyde containing an average of from 3 to 20 or more phenylol groups per molecule (cf. "Phenoplasts" by T. S. Carswell, published in 1947 by Interscience Publishers, New York). Exemplary of suitable polyphenylols derived from a phenol and an unsaturated aldehyde such as acrolein are the triphenylols, pentaphenylols, and heptaphenylols described in U.S. Patent 2,885,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U.S. Patent 2,506,486). The polyhydric polynuclear phenols can consist of two or more phenols connected by such groups as methylene, alkylene or sulfone. The connecting groups are further exemplified by bis-(4 - hydroxyphenyl)methane, bis(4 - hydroxyphenyl) dimethylmethane and dihydroxydiphenyl sulfone.

Process for the preparation of polyglycidyl ethers of polyhydric phenols is described in detail in the Bender et al. patent supra and U.S. Patent 2,801,989 to A. G. Farnham. Among the more common polyglycidyl ethers of polyhydric phenols are polyglycidyl ether of 2,2-bis(p-hydroxyphenyl)propane and polyglycidyl ether of bis(p-hydroxyphenyl)methane. Other suitable polyglycidyl ethers of polyhydric phenols are enumerated in U.S. Patent 2,633,458.

Also suitable are the polyglycidyl ethers of polyhydric alcohols such as the reaction products of epichlorohydrin and polyhydric alcohols, for example, aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Patent 2,898,389 to P. Zuppinger et al.)

Other suitable polyglycidyl compounds are the polyglycidyl esters of polycarboxylic acids such as the polyglycidyl esters of adipic acid, phthalic acid and the like. Polyglycidyl esters of polycarboxylic acids are described in detail in U.S. Patent 2,870,170 to Payne et al. Also suitable are polyglycidyl compounds produced by reacting epichlorohydrin with aromatic amines such as aniline, 2,6-dimethyl aniline, p-toluiline, m-chloroaniline, p-aminodiphenyl, m-phenylene diamine, p-phenylene diamine, 4,4'-diaminodiphenyl methane or with amino phenols such as p-amino phenol, 5-amino-1-naphthol, 4-amino resorcinol, 2-methyl-4-amino phenol, 2-chloro-4-aminophenol and the like. Specific compounds include, among others, N,N-diglycidyl aniline, N,N - diglycidyl - 2,6 - dimethyl aniline, N,N,N',N' - tetraglycidyl - 4,4' - diamino diphenyl methane, the triglycidyl derivative of p-amino phenol wherein the amino-hydrogen and OH hydrogen atoms are replaced by glycidyl groups. Polyglycidyl derivatives of aromatic amines and amino phenols and methods for their preparation are further described in U.S. Patents 2,951,822 and 2,951,825 to N. H. Reinking and to N. H. Reinking et al., respectively.

Other suitable epoxides are the following:

1,2,5,6-diepoxydimethyl cyclooctane,
3,4-epoxy-6-methylcyclohexylmethyl-3,4-epoxy-6-methylcyclohexane carboxylate,
bis(3,4-epoxycyclohexane carboxylate),
bis(2,3-epoxycyclopentyl)ether,
vinylcyclohexane dioxide,
dicyclopentadiene dioxide,
diethylene glycol bis(3,4-epoxy-6-methylcyclohexane carboxylate),
3,4-epoxycyclohexylmethyl 3,4-epoxycyclohexanecarboxylate,
3,4-epoxy-1-methylcyclohexylmethyl-3,4-epoxy-1-methylcyclohexanecarboxylate,
1,6-hexanediol bis(3,4-epoxycyclohexanecarboxylate),
bis(3,4-epoxycyclohexylmethyl)oxalate,
3,4-epoxy-6-methylcyclohexyl methyl,
9,10-epoxypentyl-4,5-epoxy pentanoate,
bis(3,4-epoxy-6-methylcyclohexylmethyl)sebacate,
diglycidyl acetal,
divinyl benzene dioxide,
dipentene dioxide,
1,2,5,6-diepoxy cyclooctane,
bis(3,4-epoxy-6-methylcyclohexylmethyl)adipate,
glycidyl 2,3-epoxy cyclopentyl ether,
3,9-bis(1,2-epoxy-1-methylethyl)spirobi(metal dioxane),
bis(3,4-epoxycyclohexyl)sulfone, glycidyl 2,3-epoxybutyl ether,
bis(2,3-epoxy-2-methylpropyl)ether,
1,1-bis(2,3-epoxy-2-methylpropoxy)ethane,
di(6-methyl-3,4-epoxycyclohexylmethyl)ether,
(6-methyl 3,4-epoxycyclohexylmethyl) (3,4-epoxycyclohexylmethyl)ether,
2,3-epoxycyclopentyl phenyl glycidyl ether and the like,
particularly those which are free of amino, amido, carboxyl and anhydride groups.

As previously stated, the curable, tacky polymers of this invention are prepared by polymerizing a polyepoxide or mixture thereof with water in the presence of a tertiary amine. Among suitable tertiary amines are those having the formula:

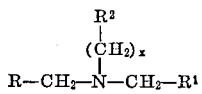

wherein $x$ is an integer having a value of 0 or 1 and R, $R^1$ and $R^2$, which can be the same or different are hydrogen or monovalent hydrocarbon radicals, particularly monovalent hydrocarbon radicals which are free of olefinic and acetylenic unsaturation, as for example, methyl, ethyl, n-propyl, isopropyl, n-butyl, n-amyl, n-hexyl, 2-ethyl-n-hexyl, n-heptyl, n-octyl, n-nonyl, n-dodecyl, benzyl, 2-phenylethyl, 3-phenyl-n-propyl, 4-phenyl-n-butyl, 5-phenyl-n-amyl, 2-phenyl-n-hexyl, 3-phenyl-n-heptyl, phenyl, o-methylphenyl, p-ethylphenyl, p-amylphenyl, o-n-butylphenyl and the like. Specific compounds include, among others, trimethylamine, triethylamine, tri-n-propylamine, tri-n-butylamine, tri-n-dodecylamine, tri-n-docosylamine, tri(2-phenylethyl)amine, tribenzylamine, dimethyl-n-propylamine, diethyl-n-propylamine, methylethyl-n-propylamine, N,N-dimethylaniline, benzyl dimethyl amine and the like.

As a general rule, the temperature at which the polymerization reaction is conducted can vary over a wide range from about 0° C. to about 250° C. A particularly preferred temperature range is about 70° C. to about 130° C.

The polymerization reaction can be conducted under atmospheric, subatmospheric or superatmospheric pressures.

In addition, organic solvents, such as benzene, toluene and the like can be used when necessary in order to fluidize the reaction mixture.

Recovery of the curable, tacky polymer from the reacted mixture can be conveniently accomplished by removing unreacted water and polyepoxide; and tertiary amine by vacuum distillation at a temperature of about 160° C.

The amount of water employed in conducting the polymerization reaction is at least about 0.1 mole per mole of polyepoxide, generally about 0.2 mole to about 3 moles and preferably about 0.5 to about 1.5 moles per mole of polyepoxide.

The tertiary amine is used in at least a catalytic amount, that is, in an amount sufficient to initiate the polymerization reaction, generally in an amount of at least about 0.1 percent by weight based on the weight of the polyepoxide, preferably about 0.1 percent by weight to about 20 percent by weight and more preferably about 1 percent by weight to about 4 percent by weight based on the weight of the polyepoxide.

As previously stated, the curable, tacky polymers of this invention are particularly suitable for use as binders in the production of structural and filament wound structures. In preparing such binders, the desired polymer is admixed with an aromatic amine and the resultant composition dissolved in a suitable organic solvent to form a solution having a solids content of about 30 to about 70 percent by weight. As a rule, the organic solvent used is a ketone, such as methyl ethyl ketone, diisopropyl ketone or an aromatic hydrocarbon, such as toluene and the like. This solution is then used to impregnate, by any suitable method, for example, dipping, spraying and the like, any desired material, for instance, glass cloth, glass filaments, boron filaments, carbon cloth, carbon filaments, nylon filaments, metal fibers, paper and the like. The solvent is removed from the impregnated material and the impregnated material is stored on a spool and subsequently formed into a desired shape and the composition cured to its infusible state.

The temperature to which each impregnated material is heated in order to effect a cure of the composition will, of course, vary and depend, in part, upon the exact formulation of the composition. As a rule, this temperature is in the range of about 80° C. to about 200° C. for a period of time ranging from about 1 to 20 hours. In the production of laminates, it is also customary to subject the impregnated material to elevated pressures.

The aromatic amines which are admixed with the polymers of this invention are those aromatic amines which contain at least two primary amino groups per molecule wherein the amino groups, which can be on the same or different aromatic nuclei, are attached directly to an aromatic nucleus, which is generally a phenyl radical, through the nitrogen atom of the amino group.

Illustrative of suitable aromatic amines are those having the formula:

FORMULA I

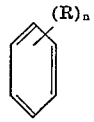

wherein each R, which can be the same or different, is halogen, e.g., chlorine, bromine and the like; primary amino groups; or hydrocarbon radicals, generally containing 1 to 20 carbon atoms inclusive and preferably containing 1 to 10 carbon atoms inclusive and $n$ is a whole number having a value of 2 to 6 inclusive; provided that at least two of the R's are primary amino groups.

Illustrative of hydrocarbon radicals for R are alkyl radicals, generally containing 1 to 20 carbon atoms inclusive and preferably containing 1 to 10 carbon atoms inclusive, such as methyl, ethyl, n-propyl, isopropyl, n-butyl, n-decyl and the like; cycloalkyl radicals, generally containing 3 to 20 carbon atoms inclusive and preferably containing 3 to 10 carbon atoms inclusive, such as cyclohexyl and the like; unsaturated alicyclic and unsaturated aliphatic hydrocarbon radicals, generally containing from 2 to 20 carbon atoms inclusive, such as cyclopentenyl, allyl and the like; halogenated alkyl and cycloalkyl radicals, generally containing 1 to 20 carbon atoms inclusive and preferably containing 1 to 10 carbon atoms inclusive, such as chloroethyl, bromoethyl, fluoroethyl, 2-chloro-n-propyl, 2-bromo-n-propyl, 2-chloro-n-butyl and the like; alkoxy and aryloxy substituted alkyl and cycloalkyl radicals, generally containing 2 to 20 carbon atoms inclusive and preferably containing 2 to 10 carbon atoms inclusive, such as methoxymethyl, ethoxyethyl, 3-ethoxy-n-propyl, 4-ethoxy-n-butyl, 2-methoxycyclohexyl, phenoxymethyl, 2-phenoxymethyl and the like; aryl radicals, generally containing 6 to 20 carbon atoms inclusive and preferably containing 6 to 18 carbon atoms inclusive, such as phenyl, tolyl and the like, as well as helogenated aryl radicals, such as p-chlorophenyl, p-bromophenyl, p - fluorophenyl, p - iodophenyl and the like; alkoxy and aryloxy substituted aryl radicals, generally containing 7 to 20 carbon atoms inclusive and preferably containing 9 to 18 carbon atoms inclusive, such as p-methoxyphenyl, p-ethoxyphenyl, p-n-propoxyphenyl and the like; alkaryl radicals, such as o-methylphenyl, p-ethylphenyl, p-n-propylphenyl, o-n-propylphenyl and the like; also those hydrocarbon radicals, as described, which are substituted with one or more amino groups.

Exemplary of such aromatic amines are the following: o-phenylenediamine, p-phenylenediamine, m-phenylenediamine, benzidene, o-toluidine, o-dianisidine and the like.

Particularly desirable aromatic amines falling within the scope of Formula I are those amines having the formula:

FORMULA II

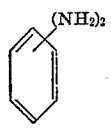

Among other suitable aromatic amines are those having the formula:

FORMULA III

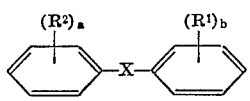

wherein $R^1$ and $R^2$ are as defined for R, $a$ and $b$ are whole numbers having a value of 1 to 5 inclusive and X is a divalent radical, as for example;

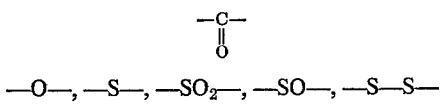

or a divalent hydrocarbon radical, wherein the amine contains at least two primary amino groups per molecule, as described, and these do not necessarily have to be attached to the same aromatic nucleus.

Illustrative of suitable divalent hydrocarbon radicals for X are the following divalent, aliphatic hydrocarbon radicals; alkylene radicals, generally containing 1 to 6 carbon atoms inclusive and preferably containing 1 to 4 carbon atoms inclusive, such as methylene, ethylene, trimethylene and the like; alkylidene radicals, generally containing 2 to 6 carbon atoms inclusive and preferably containing 2 to 4 carbon atoms inclusive, such as ethylidene, propylidene, isopropylidene and the like.

Particularly desirable aromatic amines falling within the scope of Formula III are those aromatic amines having the formula:

FORMULA IV

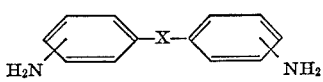

wherein X is a sulfone ($SO_2$) or a divalent hydrocarbon radical, as previously defined.

Also suitable for purposes of this invention are the aromatic amines produced on reacting aniline with formaldehyde. Specific aromatic amines falling within the scope of Formula III are the following: 4,4'-diaminodiphenylmethane, 4,4'-diaminodiphenylsulfone, bis(4-amino-2-chlorophenyl)methane and the like.

As a general rule, the amine is used in amounts of about 70 percent of stoichiometric to about 30 percent in excess of stoichiometric. For purposes of stoichiometric calculations, one epoxy group is deemed to react with one amino hydrogen atom.

It is to be understood that mixtures of aromatic amines can be used if so desired.

Also, the disclosure of all patents and literature references noted in this application are incorporated herein by reference.

The following examples further illustrate the present invention and are not intended to limit the scope thereof in any manner.

Example 1

Bis(2,3-epoxycyclopentyl)ether in the amount of 10,-032 grams (52.8 moles) was weighed into a 12 liter flask which was equipped with an agitator and reflux condenser. Three hundred and ninety one grams (3.9 percent by weight based on the weight of the diepoxide) of benzyldimethylamine and 951 grams (52.8 moles) of water were then added to the flask and the reaction mixture heated at reflux for five hours. Atmospheric reflux began at 100° C. The reacted mixture was then distilled to a temperature of 149° C. under 9 mm. of Hg and thereafter cooled to a temperature of 80° C. The distilled product was dissolved in 4200 grams of toluene and the solution was washed three times using, in each instance, 1260 grams of hot water. The washed toluene solution was distilled to 130° C. under a pressure of 10 mm. of Hg yielding 3893 grams of a tacky, curable polymer.

The polymer had an epoxide equivalent weight of 176.2 grams/gram mole and a non-volatile content of 60.3 percent by weight. The non-volatile content was determined on placing a 1.5 gram sample in an oven, which was at a temperature of 165° C. for 1 hour, removing and then weighing the sample, dividing the weight of the sample, after heating, by the weight of the sample, before heating, and multiplying by 100.

Example 2

A laminating varnish was prepared by admixing the polymer of Example 1 and a stoichiometric amount of m-phenylenediamine in methylethyl ketone. The laminating varnish had a solids content of about 40 percent by weight. 181 weave glass cloth was impregnated by passage through this varnish and twelve plies of such cloth were stacked, one upon another, and subjected to the following curing cycle:

5 hours at 120° C. under a pressure of 10 p.s.i.
10 hours at 160° C. under a pressure of 10 p.s.i.

Thereafter each laminate was subjected to tests which are indicated below, along with the results thereof. Tests were run according to the procedure described in Federal Test Method Standard No. 406.

| | |
|---|---:|
| Flexural strength, 75° F., p.s.i. | 125,100 |
| Flexural modulus, 75° F., p.s.i. | $4.09 \times 10^6$ |
| Flexural strength, after immersion in boiling water for 2 hours, p.s.i. | 112,900 |
| Flexural modulus after immersion in boiling water for 2 hours, p.s.i. | $3.69 \times 10^6$ |
| Retention of flexural strength, percent | 90 |
| Edgewise compressive strength, p.s.i. | 79,900 |
| Edgewise compressive modulus, p.s.i. | 4.32 |

Example 3

Castings, in the form of cylinders, were prepared by admixing 100 grams of a polymer (which had an epoxide equivalent weight of 168.5 and which was prepared from bis(2,3-epoxycyclopentyl)ether and water in a manner as described in Example 1) with 16.02 grams of m-phenylene diamine, casting the composition into cylindrical test tubes and heating the test tubes according to the following schedule:

2 hours at 120° C.
15 hours at 160° C.

The castings were removed from the test tubes and subjected to the tests noted below:

Compressive modulus=1,042,000 p.s.i.
Compressive yield strength=38,850 p.s.i.

In a manner as described in Example 1, tacky curable polymers were prepared from (a) diglycidyl ether of 2,2-bis(p-hydroxyphenyl)propane
(b) o-2,3-epoxy cyclopentyl glycidyl ether.

What is claimed is:

1. Process for the preparation of a tacky, curable polymer which comprises polymerizing a mixture consisting essentially of a vicinal polyepoxide free of interfering reactive groups and having at least two epoxy groups per molecule, water in an amount of about 0.2 to about 3 moles per mole of said polyepoxide and a tertiary amine in an amount of about 0.1 percent by weight to about 20 percent by weight based on the weight of said polyepoxide, said tertiary amine having the formula:

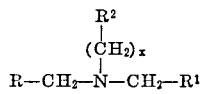

wherein $x$ is an integer having a value of 0 or 1 and R through $R^2$ are hydrogen or monovalent hydrocarbon radicals having a maximum of 22 carbon atoms, for a period of time sufficient to produce said polymer.

2. A process as defined in claim 1 wherein the water is used in amounts of about 0.5 mole to about 1.5 moles per mole of polyepoxide.

3. Process as defined in claim 1 wherein said tertiary amine is used in amounts of about 1 percent by weight to about 4 percent by weight based on the weight of the polyepoxide.

4. Process as defined in claim 1 wherein the polymerization reaction is conducted at a temperature of about 0° C. to about 250° C.

5. Process as defined in claim 1 wherein the polymerization reation is conducted at a temperature of about 70° C. to about 130° C.

6. Process as defined in claim 1 wherein the polyepoxide is bis(2,3-epoxycyclopentyl)ether.

7. Process as defined in claim 1 wherein the tertiary amine is benzyldimethylamine.

8. A tacky, curable polymer of a composition consisting essentially of a vicinal polyepoxide free of interfering reactive groups and having at least two epoxy groups per molecule, water in an amount of about 0.2 to about 3 moles per mole of said polyepoxide and a tertiary amine in an amount of about 0.1 percent by weight to about 20 percent by weight, based on the weight of said polyepoxide, said tertiary amine having the formula:

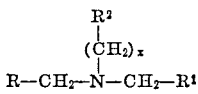

wherein $x$ is an integer having a value of 0 or 1 and R through $R^2$ are hydrogen or monovalent hydrocarbon radicals having a maximum of 22 carbon atoms.

9. A tacky, curable polymer as defined in claim 8 wherein the polyepoxide is bis(2,3 - epoxycyclopentyl) ether.

10. A curable composition comprising the polymer of claim 8 and an aromatic amine having at least two primary amino groups per molecule.

11. A curable composisition comprising the polymer of claim 8 and an aromatic amine having the formula

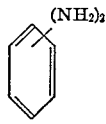

12. A curable composition comprising the polymer of claim 9 and an aromatic amine having at least two primary amino groups per molecule.

13. A curable composition comprising the polymer of claim 9 and an aromatic amine having the formula:

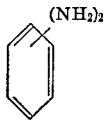

14. A tacky, curable polymer as defined in claim 8 wherein the tertiary amine is benzyldimethylamine.

15. A tacky, curable polymer as defined in claim 8 wherein the water is present in an amount of about 0.5 mole to about 1.5 moles per mole of polyepoxide and the tertiary amine is present in an amount of about 1 percent by weight to about 4 percent by weight based on the weight of the polyepoxide.

16. The cured product of the composition defined by claim 10.

17. A tacky, curable polymer as defined in claim 8 wherein said polymer has an epoxide equivalent weight of about 30 to about 550.

18. A tacky, curable polymer as defined in claim 8 wherein said polymer has an epoxide equivalent weight of about 90 to about 250.

References Cited

UNITED STATES PATENTS

| 2,924,580 | 2/1960 | Phillips et al. |
| 2,981,701 | 4/1961 | St. Clair et al. |
| 3,063,949 | 11/1962 | Phillips et al. |

WILLIAM H. SHORT, *Primary Examiner.*

T. PERTILLA, *Assistant Examiner.*

U.S. Cl. X.R.

6—186; 117—161; 161—185; 260—47, 51